(12) United States Patent
Slater et al.

(10) Patent No.: US 6,608,462 B2
(45) Date of Patent: Aug. 19, 2003

(54) METHOD AND SYSTEM FOR DETERMINING ROTOR POSITION IN A SWITCHED RELUCTANCE MACHINE

(75) Inventors: Howard James Slater, Harrogate (GB); Rosemary Anne Norman, Leeds (GB)

(73) Assignee: Switched Reluctance Drives Ltd., Harrogate (GB)

( * ) Notice: Subject to any disclaimer, the term of this patent is extended or adjusted under 35 U.S.C. 154(b) by 0 days.

(21) Appl. No.: 10/042,530

(22) Filed: Jan. 9, 2002

(65) Prior Publication Data

US 2002/0089301 A1 Jul. 11, 2002

(30) Foreign Application Priority Data

Jan. 9, 2001 (GB) .............................. 0100552

(51) Int. Cl.[7] ................................. H02P 1/46
(52) U.S. Cl. ..................... 318/701; 318/254; 318/138; 318/439; 318/700
(58) Field of Search ................. 318/254, 138, 318/439, 700, 701

(56) References Cited

U.S. PATENT DOCUMENTS

| | | | |
|---|---|---|---|
| 4,772,839 A | * 9/1988 | MacMinn et al. | 318/696 |
| 4,959,596 A | 9/1990 | MacMinn et al. | 318/254 |
| 5,001,405 A | * 3/1991 | Cassat | 318/254 |
| 5,028,852 A | * 7/1991 | Dunfield | 318/254 |
| 5,254,914 A | * 10/1993 | Dunfield et al. | 318/254 |
| 5,497,064 A | 3/1996 | Van Sistine | 318/701 |
| 5,569,990 A | * 10/1996 | Dunfield | 318/254 |
| 5,982,571 A | 11/1999 | Calfee et al. | 360/70 |
| 6,107,772 A | 8/2000 | Liu et al. | 318/701 |

FOREIGN PATENT DOCUMENTS

EP 1014556 A1 6/2000

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.
Ray, et al., "Sensorless Methods for Determining the Rotor Position of Switched Reluctance Motors," The European Power Electronics Association, 1993, pp. 7–13.
Panda, S.K., et al., "Further Developments on Indirect–Rotor Position Sensing of Variable–Reluctance Motors Using Waveform–Detection Technique," IEEE, 1993, pp. 1009–1014.
Matsuo, T. and Lipo, T., "Rotor Position Detection Scheme for Synchronous Reluctance Motor Based on Current Measurements," IEEE, 1994, pp. 627–634.

* cited by examiner

Primary Examiner—Bentsu Ro
Assistant Examiner—Rina I. Duda
(74) Attorney, Agent, or Firm—Dicke, Billig & Czaja, PLLC

(57) ABSTRACT

A switched reluctance machine is controlled without using a physical rotor position detector. The rotor position at start-up is determined by simultaneously injecting a current of known magnitude into two phases. The rise times of the currents are measured and used to interrogate a stored table of rise time against rotor angle for the known current level. This produces two possible rotor positions from each rise time. Comparisons of the pairs of angles yield the actual position.

26 Claims, 6 Drawing Sheets

| Angle | Time |
|-------|------|
| 0 | 79 |
| 10 | 70 |
| 20 | 59 |
| 30 | 42 |
| 40 | 26 |
| 50 | 17 |
| 60 | 14 |
| 70 | 13 |
| 80 | 13 |
| 90 | 14 |
| 100 | 15 |
| 110 | 20 |
| 120 | 26 |
| 130 | 31 |
| 140 | 40 |
| 150 | 52 |
| 160 | 64 |
| 170 | 78 |
| 180 | 79 |

METHOD AND SYSTEM FOR
DETERMINING ROTOR POSITION IN A
SWITCHED RELUCTANCE MACHINE

CROSS-REFERENCE TO RELATED APPLICATION

The subject matter of this application is related to the subject matter of British Patent Application No. GB 0100552.9, priority to which is claimed under 35 U.S.C. §119 and which is incorporated herein by reference.

BACKGROUND OF THE INVENTION

1. Field of the Invention

Aspects of the invention relate to determining rotor position in a switched reluctance machine.

2. Description of Related Art

The control and operation of switched reluctance machines generally are described in the paper "The Characteristics, Design and Applications of Switched Reluctance Motors and Drives" by J M Stephenson and R J Blake, delivered at the PCIM '93 Conference and Exhibition held in Nurnberg, Germany, Jun. 21–24, 1993, which paper is incorporated herein by reference. In that paper the "chopping" and "single-pulse" modes of energization of switched reluctance machines are described for operation of the machine at low and high speeds, respectively. A typical prior art drive is shown schematically in FIG. 1 and one of the many known converter topologies is shown in FIG. 2, where a resistor 28 is connected in series with the lower switch 22 to provide a current feedback signal.

More specifically, FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. To this end, a rotor position detector 15 is typically employed to supply signals corresponding to the angular position of the rotor. The rotor position detector 15 may take many forms, and its output may also be used to generate a speed feedback signal.

Many different power converter topologies are known, several of which are discussed in the Stephenson paper cited above. FIG. 2 shows a configuration for a single phase of a polyphase system in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current"), which cannot be drawn from or returned to the supply. In practice, the capacitor 25 may comprise several capacitors connected in series and/or parallel and, where parallel connection is used, some of the elements may be distributed throughout the converter.

The performance of a switched reluctance machine depends, in part, on the accurate timing of phase energization with respect to rotor position. Detection of rotor position is conventionally achieved by using a transducer mounted in relation to the machine rotor shaft, as referenced above and as shown schematically in FIG. 1, in which a rotating disk is mounted on the machine rotor shaft which co-operates with a fixed optical or magnetic sensor. A pulse train indicative of rotor position relative to the stator is generated and supplied to control circuitry, allowing accurate phase energization. A significant property of such a device is that it functions at zero rotor speed, allowing the control circuit to identify the correct phase(s) to energize to provide torque in the desired direction.

This system is simple and works well in many applications. However, the rotor position transducer increases the overall cost of assembly, adds extra electrical connections to the machine and is, therefore, a potential source of unreliability. Various methods for dispensing with the rotor position transducer have been proposed, and several of these are reviewed in "Sensorless Methods for Determining the Rotor Position of Switched Reluctance Motors" by W F Ray and I H Al-Bahadly, published in the *Proceedings of The European Power Electronics Conference,* Brighton, UK, Sep. 13–16 1993, Vol. 6, pp 7–13, incorporated herein by reference.

Many of these methods proposed for rotor position estimation use a measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 3.

In general, these methods require the machine to be rotating for the position-determining algorithms to function correctly. Starting from rest generally requires a quite different technique to run the machine up to some appropriate speed so that the algorithms can take over. For example, EP-A-1014556 (Green), incorporated herein by reference, describes a method of injection of pre-determined pulses of flux linkage into two phases in order to compile sufficient data to interrogate a stored table of current and rotor angle. This method requires a control system with sufficient capacity to capture current readings simultaneously and with the capability to integrate the applied voltage.

Similarly, U.S. Pat. No. 6,107,772 (Dana), incorporated herein by reference, discloses a method of injecting current into three phases of a polyphase machine and performing a series of comparisons on the results of measurements of the times taken for the three currents to traverse between two predetermined levels. This method requires significant computing ability and the capability to store the results of intermediate steps.

SUMMARY OF THE INVENTION

In one embodiment, the present invention provides a method of determining rotor position at zero speed by timing the rise of current in phases to a predetermined level. The rise time of phase current is directly related to the inductance of the magnetic circuit for that phase and rotor position, since the inductance is determined by the position of the rotor poles relative to the stator poles for that phase. The invention in this embodiment injects current coincidentally into two phases. A simple look-up table, storing rotor angles for ordinates of time, can be used to allow the rotor position to be determined by comparing the possible rotor positions according to each reading for substantial agreement.

Each phase has a phase inductance cycle. Thus, two phases have such cycles which are phase shifted. By comparing the results of timing the rise in current according to embodiments of the invention, there will be substantial agreement between two points in both inductance cycles but not elsewhere. From this substantial agreement from the outcomes of the measurements, the rotor position can be derived.

One form of the invention provides a sensorless control method which can work with any power converter circuit at zero rotor speed, does not require large amounts of stored data or expensive current feedback and yet can be robust in the presence of noise on the waveforms from which it deduces position. Embodiments of the invention do not require any stored flux-linkage data, which is generally costly on memory space.

To be able to equate the times for the phase currents to reach the threshold directly, the same voltage needs to be applied to both phases. If the voltage applied is not the same as that used to provide the basic data by which to equate current rise time to rotor angle, the monitored times can be scaled by a ratio of the voltages.

BRIEF DESCRIPTION OF THE DRAWINGS

Embodiments of invention can be put into practice in various ways, some of which will now be described by way of example with reference to the accompanying drawings in which.

DETAILED DESCRIPTION OF PREFERRED EMBODIMENTS

The skilled person will be aware that the phase inductance cycle of a switched reluctance machine is the period of the variation of inductance for the or each phase, for example between maxima when the rotor poles are fully aligned with the stator poles. An embodiment described uses a 2-phase switched reluctance drive, but any greater phase number could be used.

Figure 1:
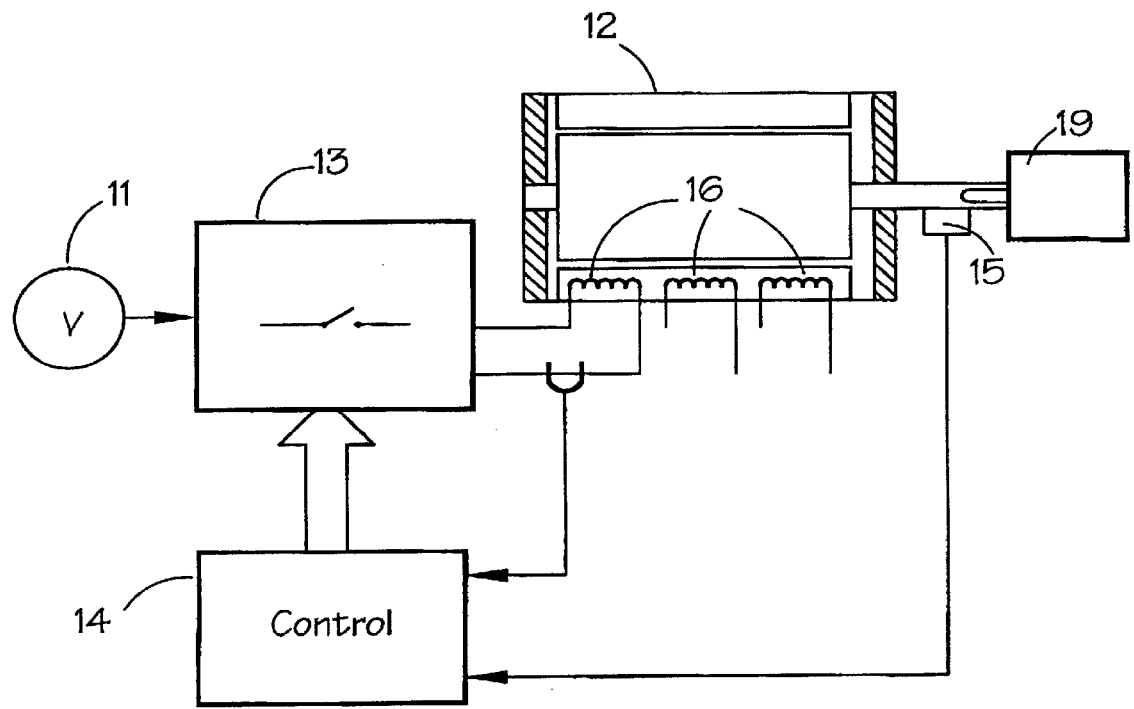
FIG. 1 shows a typical prior art switched reluctance drive.
Figure 4:
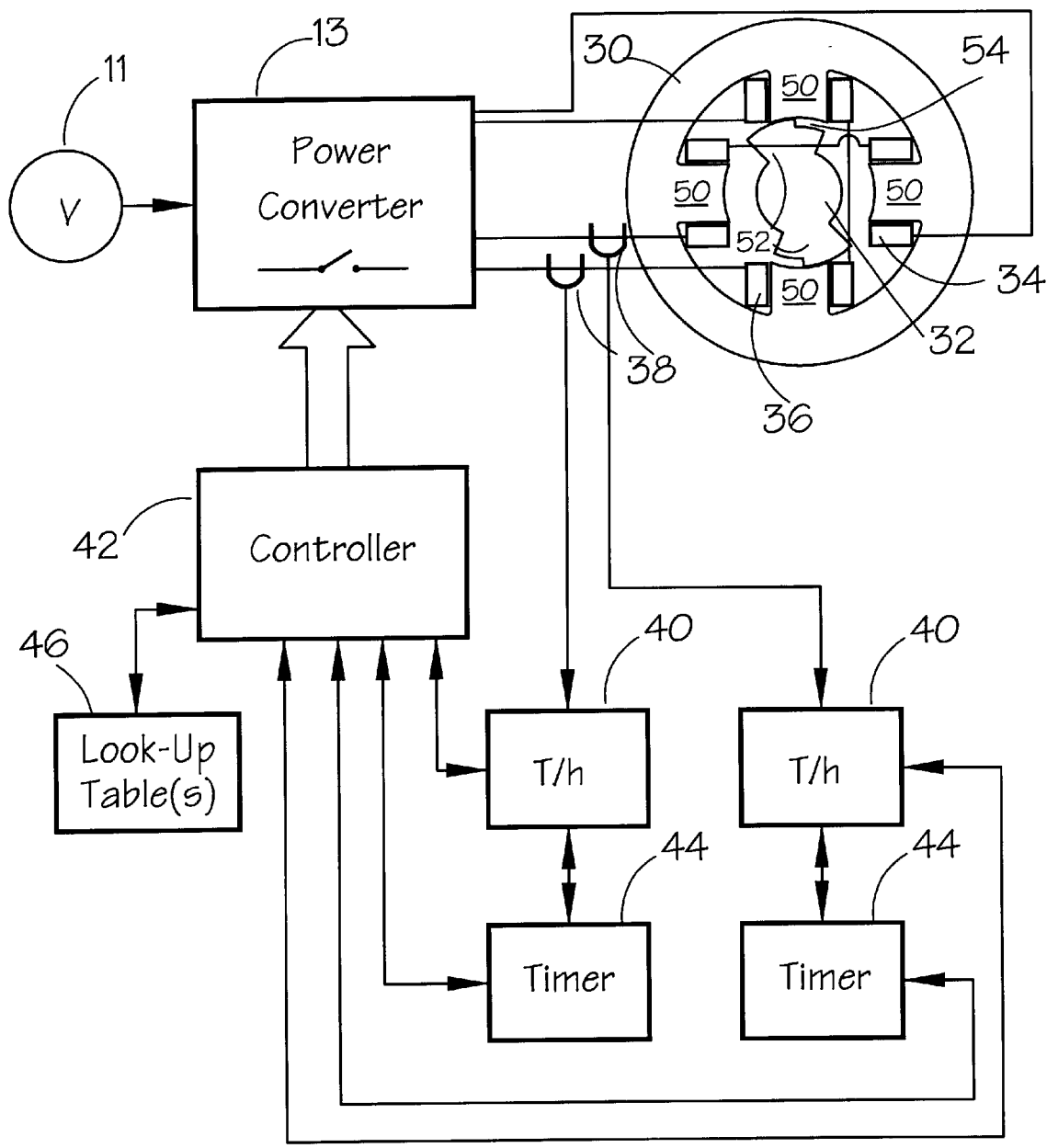
FIG. 4 shows a switched reluctance drive according to an embodiment of the invention.

FIG. 4 shows a switched reluctance drive according to an embodiment of the invention. It is based on the drive in FIG. 1 and like parts have been given like reference numerals. The machine itself comprises a stator 30, a rotor 32, mounted to rotate within the stator, and two phase windings 34/36 which are connected to the voltage source 11 through the switch circuit 13. In this embodiment, a current sensor or transducer 38 is placed in relation to each of the two phase windings 34/36 to provide signals indicative of current for determining the position of the rotor with respect to the stator. The rate of rise of current depends on the inductance of the phase circuit, which is, in turn, dependent on rotor position.

The output of each current sensor 38 is respectively connected to a threshold detector 40, which is each controlled to be reset by a controller 42. A timer 44 is connected to be actuated by the controller and deactuated by an output of its associated threshold detector 40. An addressable look-up table 46 is connected to the controller 42. The look-up table 46 contains values of rotor position for ordinates of time for the current to reach the threshold according to the phase inductance. Many of the components referred to above can be implemented as part of a microprocessor or application specific integrated circuit (ASIC). For example, the timers 44 and the look-up table 46 need not be separate entities. FIG. 4 is largely schematic for the purpose of illustrating embodiments of the invention.

Figure 2:
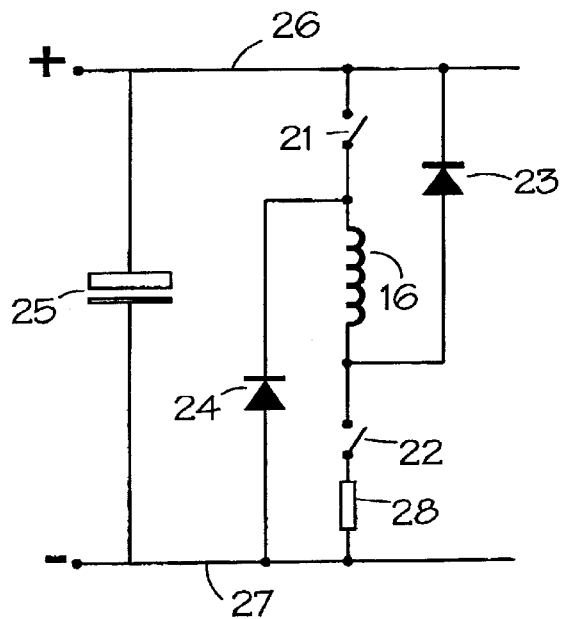
FIG. 2 shows a known topology of one phase of the converter of FIG. 1.

When it is desired to start the drive, the same voltage is applied to the two phases associated with windings 34/36, thus injecting current. If, for example, the drive uses the power circuit topology of FIG. 2, both switches of each phase are closed simultaneously by the controller 42 so that both phases are exposed to the supply voltage. A threshold current level is previously set in the threshold detectors 40. For example, this level could be approximately the peak current used during normal operation of the drive, or could be some other convenient level. As the current sensed by the current sensor 38 in one of the phases reaches the predetermined threshold level according to the rate of rise of the current, its threshold detector 40 stops the timer 44 to record the time taken from zero current when the supply voltage was first applied. Simultaneously, the switches for that phase are opened by the controller 42. The same operation takes place in respect of the other phase as and when its current reaches the same threshold.

The controller 42 is also connected to the look-up table 46 in which are stored values of rotor position against rise time for the predetermined threshold current. Such a table for a typical small machine for a current value of 3.3 Amps can be derived from the measured data shown in FIG. 5. The machine has 4 stator poles 50 and 2 rotor poles 52. The rotor has a pole face profile that defines a stepped air gap 54 together with the stator pole face. The step in the air gap allows for a starting torque when one of the phases is energized.

Figure 6:
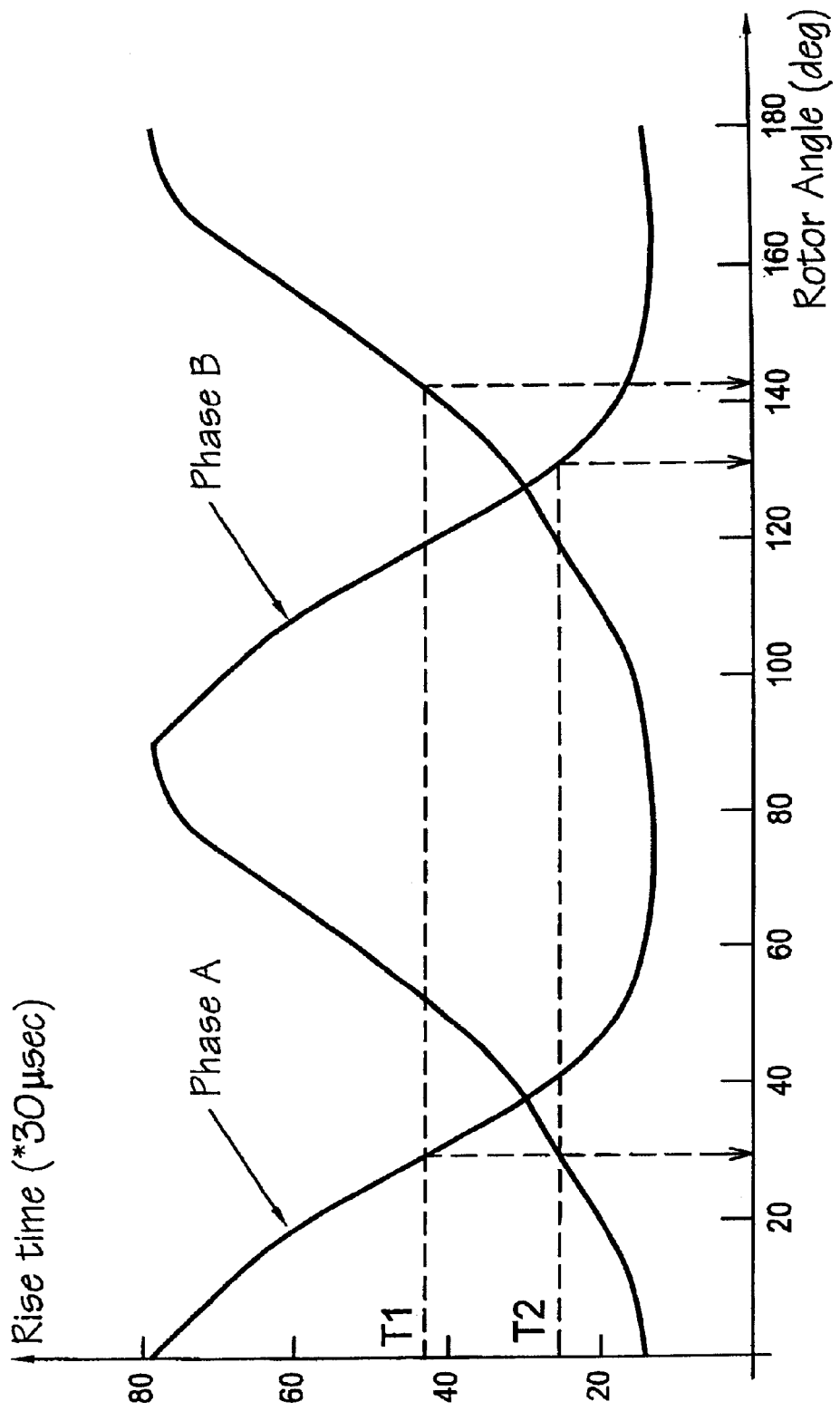
FIG. 6 shows graphs of current rise times against rotor angle, according to an embodiment of the invention.

FIG. 6 shows the rise times associated with rotor position for Phase A in graphical form. The x-axis is in mechanical degrees and, since the stator has 2 pole pairs, 180° corresponds to a phase inductance cycle. For a machine with a larger number of phases the rise time unit values will repeat within a shorter angular span. The number of entries of angle for ordinates of unit time values is a compromise between memory space and accuracy for a given situation. The y-axis is in units of time convenient to the storage medium in the controller, and here each unit corresponds to 0.00003 seconds. The curve marked Phase B corresponds to the curve for Phase A displaced by 90°. Two sample times, T1 & T2, are indicated by the broken lines in FIG. 6. T1 indicates two possible positions for Phase A, viz 29° and 143°; T2 similarly indicates two possible positions for Phase B, viz 29° and 131°. By comparison carried out in registers (not shown) in the controller 42, this defines the rotor position as 29°, since only one rotor position can exist at any time. Provided that there is no significant movement of the rotor during the measurement of the rise times, this method is robust and accurate. However, it is preferable for the results of the comparison to recognize 'agreement' between the possible positions from one phase with those from another as including an upper and lower limit on a difference between the closest match.

Figures 3, 5:
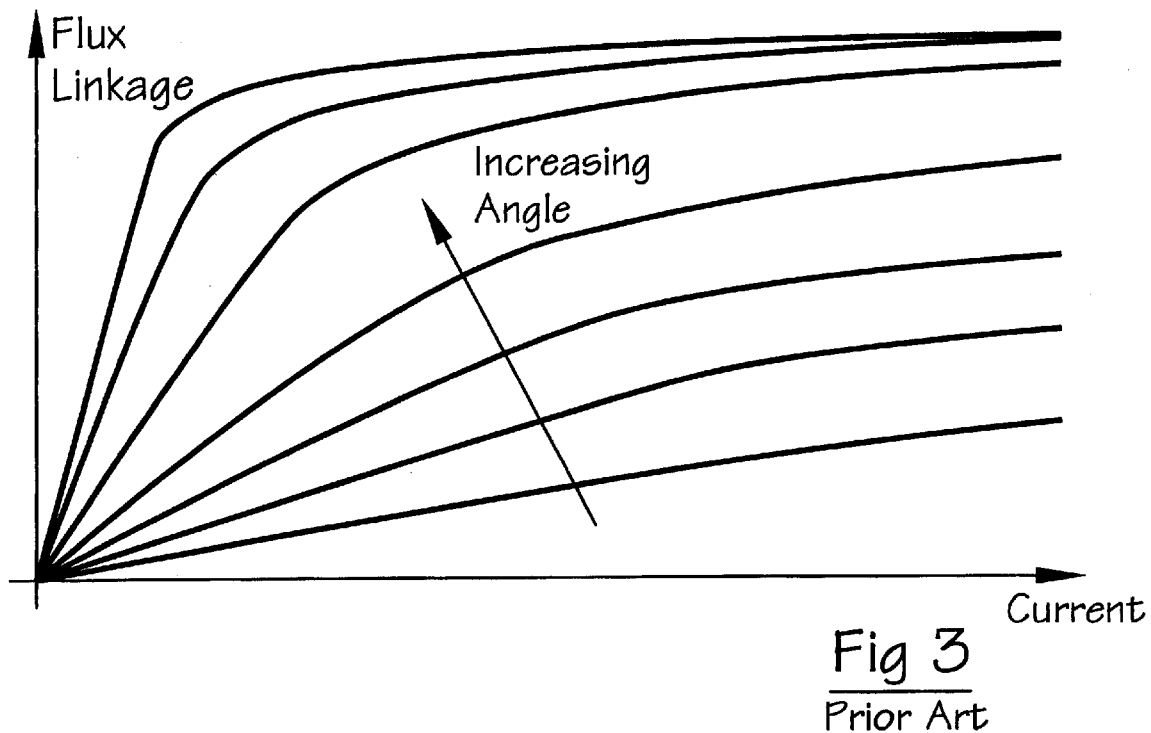
FIG. 3 shows the flux-linkage vs. current curves which characterize the magnetic behavior of a switched reluctance machine.
FIG. 5 shows a table of current rise time against rotor angle for one phase winding, according to an embodiment of the invention.

Errors will be introduced if the voltage used to drive the machine is different from that used for the gathering of the data used in the look-up table 46 and as set out in FIG. 5, since a different voltage will produce a different rate of rise of phase current which, in this case, means different times to reach the threshold set in the detectors 40. These errors can be eliminated, or at least greatly reduced, by simply scaling the measured rise times by the ratio of the applied voltage to the characterizing voltage used to create the look-up table data. This can be straightforwardly implemented by the control system using standard multiplication and division routines. A non-linear scaling, e.g. to compensate for magnetic non-linearity, could be used if a more accurate result is required.

Figure 7:
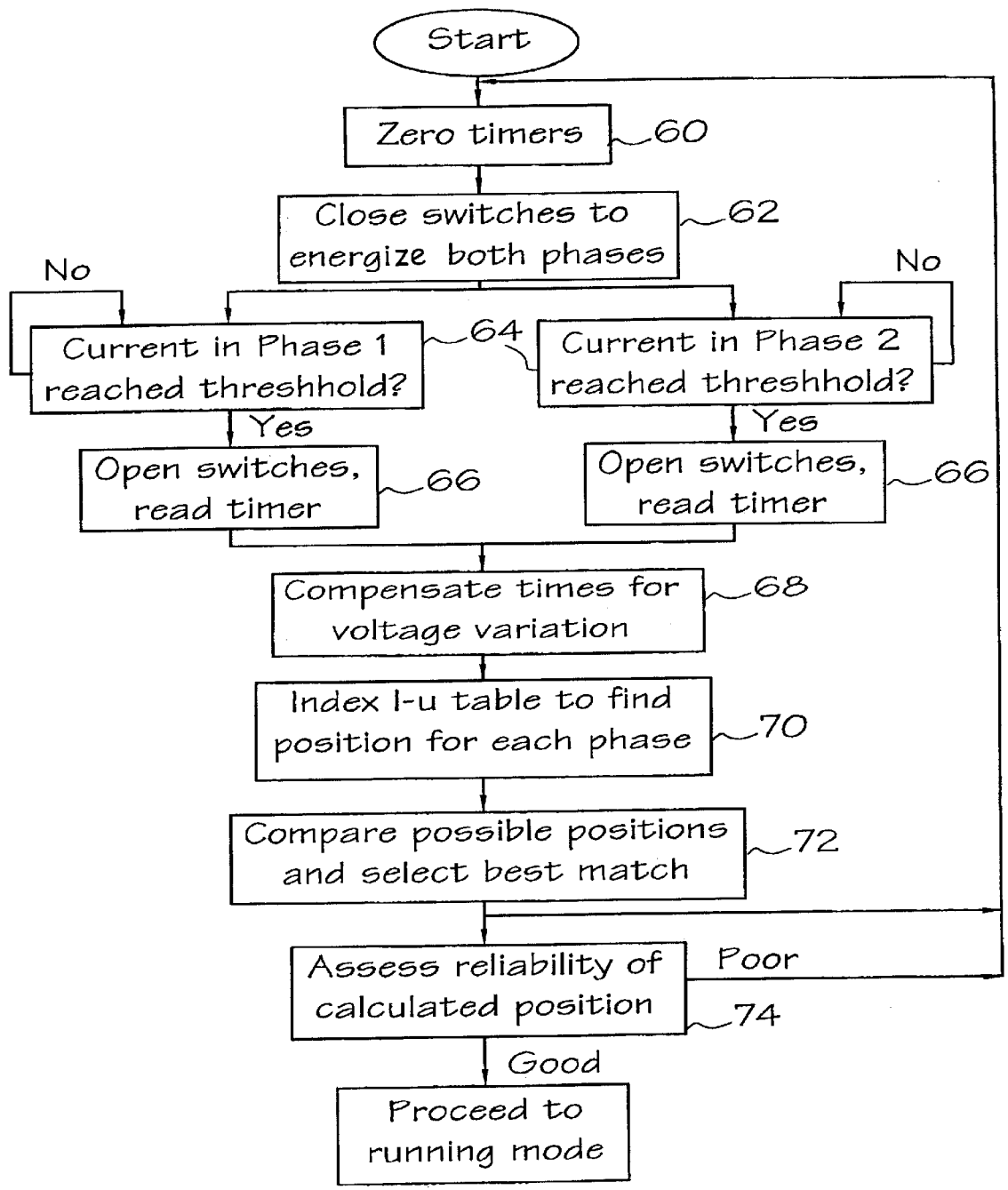
FIG. 7 is a flow diagram, according to an embodiment of the invention.

A method for determining rotor position according to embodiments of the invention is summarized in the flow-chart of FIG. 7 with particular reference to such determination on start-up of the switched reluctance machine. Embodiments of the invention are also applicable to rotor position determinations after start-up.

At step 60 the process is started by zeroing the timers 44 for the two phase currents that are to be monitored by means of the transducers 38. The switches 21/22 by which the supply voltage is applied across each of the two phases are closed at step 62, causing the current in each phase to rise towards the predetermined threshold value. The rising current is monitored in step 64 by the threshold detectors 40. When the threshold value is reached by the current in one phase, its switches are opened at step 66. Because of the difference in the position of the rotor relative to the phases being monitored for current, the threshold current will be reached at different times due to the different prevailing inductances of the two phase circuits.

Once both phase currents have reached the threshold, and both associated pairs switches 21/22 have been opened, the times to reach the threshold are compensated for at step 68. This takes account of any difference between the voltage used to determine the current values in the look-up table 46 and the supply voltage applied across the phases. This is a simple scaling operation based on the ratio of the two voltages.

At step 70 the look-up table 46 is accessed to fetch the values of possible rotor position corresponding to the two points in the curves in FIG. 6 for the compensated times taken to reach the threshold value. At step 72 the two values of possible rotor position for each phase are compared against each other by the controller 42 to identify the two closest from each set. If there is any disagreement between the two best matching values for rotor position, but the disagreement is within acceptable limits, the controller picks the value derived from the phase which first reached the current threshold as the nominated rotor position. This is on the basis that the quicker the threshold is reached, the less opportunity there is for distortions to be injected due to noise. Other techniques, such as taking the average between the two best matching readings, could be used to similar effect. If the disagreement is not within acceptable limits, the method is repeated from step 60.

An alternative form of the invention is reflected in the flowchart of FIG. 7 in which an assessment is made of the reliability of the result of the comparison at step 74. This is an optional step that can be advantageously employed in certain circumstances. There are regions on the curves for the two phases in FIG. 6 which are more susceptible than other regions to producing ambiguous readings for rotor position in the presence of noise. In respect of the machine whose characteristic curves are shown in FIG. 6, these occur at the intersections of the two curves at about 40° and 125°. Particularly in these regions, noise can contribute to distortions in the possible rotor position such that the wrong set of values can appear to be the best match. In the case of the curves in FIG. 6, this can lead to a determination of rotor position that is wrong by about 85°. If the possible rotor position values fall in predefined regions about these points (say within about + or −5°) the readings are considered unreliable in any event and the process for determining rotor position is restarted from step 60. To avoid a repeat of the problem in the second attempt at establishing rotor position according to this embodiment of the invention, a burst of pulses of current is applied to one of the phases to shift the rotor with respect to the stator, away from the region of ambiguity, in time for the subsequent readings to be taken. This is described in further detail below.

The skilled person will realize that it is not necessary to store separate curves for Phases A & B if they are symmetrical in the machine: a simple offset in the data corresponding to the physical phase shift between the phases is all that is required. Standard methods of coping with noise in the rise time measurements and quantization in the stored data can be applied to eliminate the small errors which would otherwise arise. Similarly, any one of a variety of conventional methods can be used to read the angular information from the table(s) of information: for example the data could be held as two small tables, one with angles from minimum to maximum inductance values and the other from maximum to minimum inductance values—such an arrangement would allow rapid access of data stored in a memory system.

Figure 8:
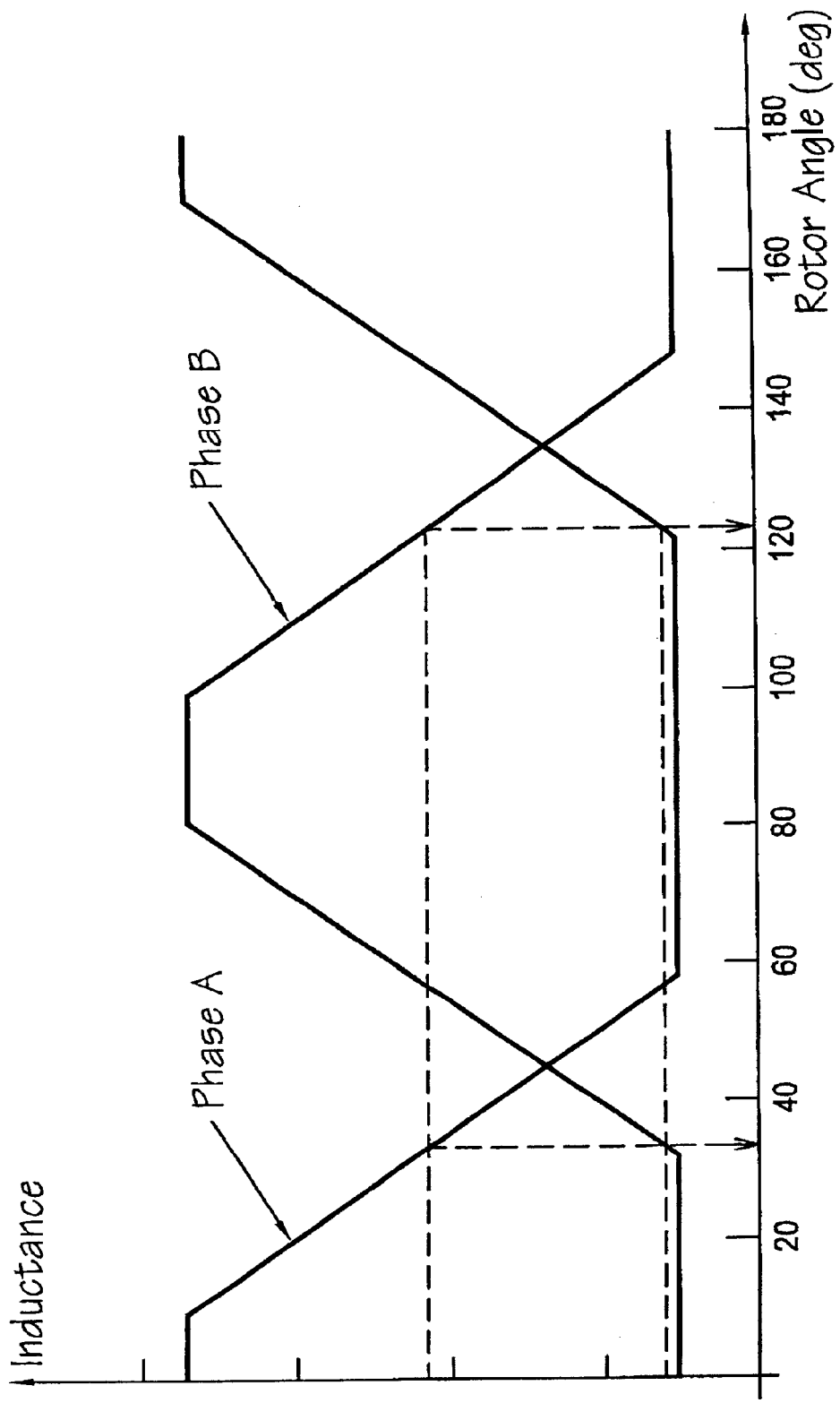
FIG. 8 shows the inductance profiles of an ideal, 2-phase machine in accordance with an embodiment of the invention.

The 2-phase motor has phases which are spatially displaced by 180° (electrical), so the inductance profiles are placed symmetrically with respect to each other. If the rotor pole geometry were also symmetrical, then the inductance profiles would also have an axis of symmetry, as shown in FIG. 8 for an idealized machine without any fringing paths. These profiles would yield rise time profiles of a similar symmetry and the broken lines indicate that there is now ambiguity in the perceived rotor position, since both curves indicate the same possible position. It is the introduction of asymmetry into the inductance profile (and hence into the rise-time curves) that produces the information which allows the elimination of the incorrect rotor angles. Specifically, it is the difference in slopes between the rising and falling portions of the rise time curves which provides the necessary asymmetry, and this naturally occurs in a 2-phase machine which has a stepped air gap for developing starting torque. However, it follows that if there are areas of the curve where the slopes have little asymmetry then the ability to resolve the ambiguity of possible positions will be limited. When the uncertainties due to errors in current rise time and in characterizing the machine are included, there could be cases in which one or more angular regions do not yield reliable position determination.

This uncertainty can be overcome by simply moving the rotor a small angular amount, for example by firing a current pulse of larger magnitude into one phase by applying a larger voltage across the phase to create a torque, and then performing a new estimate of position using equal voltages. An alternative method is to use a plurality of diagnostic pulses in a burst in the phase inductance period so that the average torque applied to the rotor increases and the rotor will slowly move to a new position. During this period, the controller can interpret the results from each or a selection of the diagnostic pulses so that it has an almost continuous stream of data, which is improving in reliability, as the rotor moves away from the region of uncertainty. The controller can be programmed to apply these extra pulses for a predetermined time or to decide when the data is sufficiently reliable, according to repeatability of agreement of results, and to proceed in the usual fashion.

It will be appreciated that the problem of symmetry is unique to a 2-phase machine. For any higher phase number with stator phases disposed symmetrically, there is always at least one pair which are not mutually symmetrical. For example, in a 3-phase machine, adjacent phases are 120° apart; in a 4-phase machine, although every second phase is 180° apart, adjacent phases are 90° apart; in a 5-phase machine any two phases are suitable. Thus, in machines with 3 or more phases the problem either does not arise because of the relative shifts between the phases, or the appropriate neighboring phases can be chosen to avoid ambiguous pairs.

In the example discussed above, it is assumed that one current sensor is used for each phase leg. The technique is not restricted to such an arrangement. If the current waveforms are such that a current sensor, arranged to sense the combined currents of all the phases, provides a signal which can uniquely identify the individual currents, then embodiments of the invention can be applied to this arrangement. Further, aspects of the invention have been described above in relation to embodiments in which the thresholds that each phase current has to reach are the same. Different thresholds could be set as long as the times recorded for each phase current rise are thereafter scaled to take account of the difference or provided that the look-up table for each phase is characterized according to the appropriate threshold.

The skilled person will appreciate that variation of the disclosed arrangements is possible without departing from the invention, for example in the details of the implementation of the algorithm in the microprocessor. Accordingly, the above description of several embodiments is made by way of example and not for the purposes of limitation. It will be clear to the skilled person that modifications can be made to the drive circuit without significant changes to the operation described above. The present invention is intended to be limited only by the spirit and scope of the following claims.

What is claimed is:

1. A method for determining the position of a rotor relative to a stator of a polyphase switched reluctance machine, the method comprising:
   energizing at least two phases coincidentally;
   monitoring the rise time of current in each of the phases to a predetermined threshold;
   equating the rise time of current in each phase to possible positions of the rotor due to cyclical variations in inductance in each phase with rotor position; and
   comparing the possible positions of the rotor for substantial agreement between them to derive the actual rotor position.

2. A method as claimed in claim 1, in which values of possible rotor position are stored in storage means as ordinates of values of rise time of current.

3. A method as claimed in claim 2, in which the cyclical variations in inductance for the phases are similar, the method further comprising:
   storing in the storage means a set of values and corresponding ordinates for a single datum phase inductance cycle; and
   applying a phase shift to the possible rotor positions for one or both of the phases corresponding to the arrangement of that phase relative to the datum for equating the possible rotor positions for that phase.

4. A method as claimed in claim 2, in which the values are stored in two or more tables.

5. A method as claimed in claim 1, including energizing each of at least two phase windings coincidentally by applying a voltage of predetermined magnitude across the at least two phase windings and scaling the monitored current rise time according to the voltage before equating the rise time for each phase to the possible positions of the rotor.

6. A method as claimed in claim 1, including determining from the possible rotor positions whether the rotor is in a predefined region in which a phase inductance cycle for the machine may give ambiguous results for rotor position from the comparison.

7. A method as claimed in claim 1, including energizing each of the at least two phases with different magnitudes of voltage, such that the rotor is caused to move relative to the stator and, thereafter, energizing the at least two phases coincidentally.

8. A method as claimed in claim 6, including energizing each of the at least two phases with different magnitudes of voltage, such that the rotor is caused to move relative to the stator and, thereafter, energizing the at least two phases coincidentally when the rotor is in the said predefined region.

9. A method as claimed in claim 1, in which the at least two phases are energized repeatedly in a phase inductance period to allow repeated derivations of the actual rotor position.

10. A method as claimed in claim 9, in which the energization is in the form of pulses.

11. A method as claimed in claim 9, in which the energization is repeated for a predetermined time.

12. A method as claimed in claim 10, in which the number of pulses applied in a phase inductance period is predetermined.

13. The method of claim 1, wherein the position of the rotor relative to the stator of the polyphase switched reluctance machine is determined on start-up.

14. A system for determining the position of a rotor relative to a stator of a polyphase switched reluctance machine, the system comprising:
   means for energizing at least two phases coincidentally;
   means for monitoring the rise time of current in each of the phases to a predetermined threshold;
   means for equating the rise time of current in each phase to possible positions of the rotor due to cyclical variations in inductance in each phase with rotor position; and
   means for comparing the possible positions of the rotor for substantial agreement between them to derive the actual rotor position.

15. A system as claimed in claim 14, including storage means for storing values of possible rotor position as ordinates of values of current rise time, the means for equating including means for addressing the storage means according to the monitored rise time in the phases.

16. A system as claimed in claim 15, in which the storage means stores values of possible rotor position for ordinates of values of current rise time for a single datum phase inductance cycle of the machine, the means for equating further comprising means for applying a phase shift to the possible rotor positions for one or both of the phases corresponding to the arrangement of that phase relative to the datum for equating the possible rotor positions for that phase.

17. A system as claimed in claim 15, in which the values of possible rotor position are stored in two separate tables in the storage means.

18. A switched reluctance drive system, including a system for determining the position of the rotor as claimed in claim 14, and further including means for energizing at least two phase windings for the at least two phases.

19. A system as claimed in claim 14, in which the means for energizing is operable to apply a predetermined voltage across at least two phase windings for the at least two phases, the system further comprising means for scaling the monitored rise times of current according to the predetermined voltage before equating the rise times of the current for each phase to the possible positions of the rotor.

20. A system as claimed in claim 14, including means for determining from the possible rotor positions whether the rotor is in a predefined region in which the phase inductance cycle may give ambiguous results for rotor position from the comparison.

21. A system as claimed in claim 20, in which the means for energizing is operable to apply voltages of different magnitudes across at least two phase windings for the at least two phases, such that the rotor is caused to move relative to the stator, and is thereafter operable to energize the at least two phase windings coincidentally.

22. A system as claimed in claim 20, wherein the means for energizing are operable to apply voltages of different magnitudes across at least two phase windings for the at least two phases, such that the rotor is caused to move relative to the stator, and is thereafter operable to energize the at least two phase windings coincidentally when the rotor is in the said predefined region.

23. A system as claimed in claim 19, in which the means for energizing are operable to energize the at least two phases repeatedly in a phase inductance period.

24. A system as claimed in claim 23, in which the means for energizing are operable to apply a voltage across each of the at least two phase windings in the form of pulses.

25. A system as claimed in claim 23, in which the means for energizing are operable to repeat the energization for a predetermined time.

26. A system as claimed in claim 24, in which the means for energizing are operable to apply the voltage across the at least two phase windings in the form of a predetermined number of pulses.

* * * * *